(12) United States Patent
Pietila et al.

(10) Patent No.: US 9,093,773 B2
(45) Date of Patent: Jul. 28, 2015

(54) TETHERED USB CHARGER CAP

(71) Applicant: Ford Global Technologies, LLC, Dearborn, MI (US)

(72) Inventors: Thomas William Pietila, Brighton, MI (US); Scott Simon, Dexter, MI (US); Anthony Ligi, Chelsea, MI (US); Andrew Schafer, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/104,040

(22) Filed: Dec. 12, 2013

(65) Prior Publication Data

US 2015/0171542 A1 Jun. 18, 2015

(51) Int. Cl.
*H01R 13/44* (2006.01)
*H01R 13/447* (2006.01)
*B60L 1/00* (2006.01)

(52) U.S. Cl.
CPC .............. *H01R 13/447* (2013.01); *B60L 1/006* (2013.01)

(58) Field of Classification Search
CPC .............................. H01R 13/447; B60L 1/006
USPC .......................................... 439/135, 136, 138
See application file for complete search history.

(56) References Cited

U.S. PATENT DOCUMENTS

| 7,736,033 | B2 * | 6/2010 | Patel .............................. 362/414 |
|---|---|---|---|
| D652,384 | S | 1/2012 | Lee |
| D655,676 | S | 3/2012 | Au |
| 8,148,940 | B2 | 4/2012 | Liu |
| D667,377 | S | 9/2012 | Chan |
| 8,277,239 | B1 | 10/2012 | Chan et al. |
| 8,435,041 | B2 | 5/2013 | Holland |
| 2011/0223806 | A1 | 9/2011 | You |
| 2012/0045939 | A1 | 2/2012 | Pocrass |

FOREIGN PATENT DOCUMENTS

| CN | 202111278 U | 1/2012 |
|---|---|---|
| CN | 102386521 A | 3/2012 |
| CN | 202564678 U | 11/2012 |
| CN | 202669563 U | 1/2013 |
| WO | 2009150538 A2 | 12/2009 |
| WO | 2013034928 A1 | 3/2013 |

* cited by examiner

*Primary Examiner* — Javaid Nasri
(74) *Attorney, Agent, or Firm* — Vichit Chea; Price Heneveld LLP

(57) ABSTRACT

An electrical socket cap includes a tether between the cap and an electrical socket, wherein the tether provides power to the cap. The cap is adapted to close an opening to the electrical socket in a closed position, and further adapted to allow access to the electrical socket in an open position. The cap further includes inner and outer surface which include one or more electrical ports disposed thereon. Electrical ports disposed on the inner surface are not accessible when the cap is in the closed position, while ports disposed on the outer surface of the cap are accessible when the cap is in the closed position. Electrical ports disposed on the inner surface are accessible when the cap is in the open position while the electrical socket is also accessible. The tether is electronically coupled to the electrical socket.

19 Claims, 7 Drawing Sheets

TETHERED USB CHARGER CAP

FIELD OF THE INVENTION

The present invention generally relates to an electrical socket cap, and more particularly to a powered electrical socket cap which includes one or more electrical ports disposed on an outer surface of the cap, such that the electrical ports are accessible when the cap is in a closed position over an electrical socket opening.

BACKGROUND OF THE INVENTION

Generally, an electrical port, such as a universal serial bus (USB) port or a micro-USB port, may be disposed within a console or other like storage compartment within a vehicle interior. A number of vehicle interiors include a standard electrical socket disposed on the dash in a vehicle console which generally includes a cover or cap that is adapted to close off a receptacle opening. When the cover or cap to the electrical socket is removed, the opening to the receptacle is accessible in which a USB adapter can be powered by, for example, a standard 12-volt receptacle. The adapter can then accept a USB cord for connecting to a portable electronic device for powering the device. Opening a console lid and finding a USB port can be difficult or awkward while driving.

It is desirable to provide an electrical power socket that includes a powered cap which may be tethered to the electrical power socket and powered by the same power source as the electrical power socket. It is further desired to provide a powered cap which includes one or more electrical ports that are readily accessible when the cap is in the closed position over an opening of the electrical socket.

SUMMARY OF THE INVENTION

One aspect of the present invention includes, an electrical socket including a receptacle having an opening with a removable cap. The cap includes an inner surface and an outer surface. A tether is coupled to the receptacle and the cap. A first electrical port is disposed on the outer surface of the cap, and a second electrical port is disposed on the inner surface of the cap. The second electrical port is accessible when the cap is in an open position.

Another aspect of the present invention includes, an electrical socket including a socket well having an opening for receiving an electrical plug. A cap includes inner and outer surfaces, wherein the cap is operable between open and closed positions relative to the opening of the socket well. At least one electrical port is disposed on the outer surface of the cap and is accessible when the cap is in the closed position.

Yet another aspect of the present invention includes, a cap for an opening of an electrical socket including a first electrical port disposed on an outer surface and a second electrical port disposed on an inner surface. The first electrical port alone is accessible when the cap is in a closed position. Both the first and second electrical ports are accessible when the cap is in an open position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
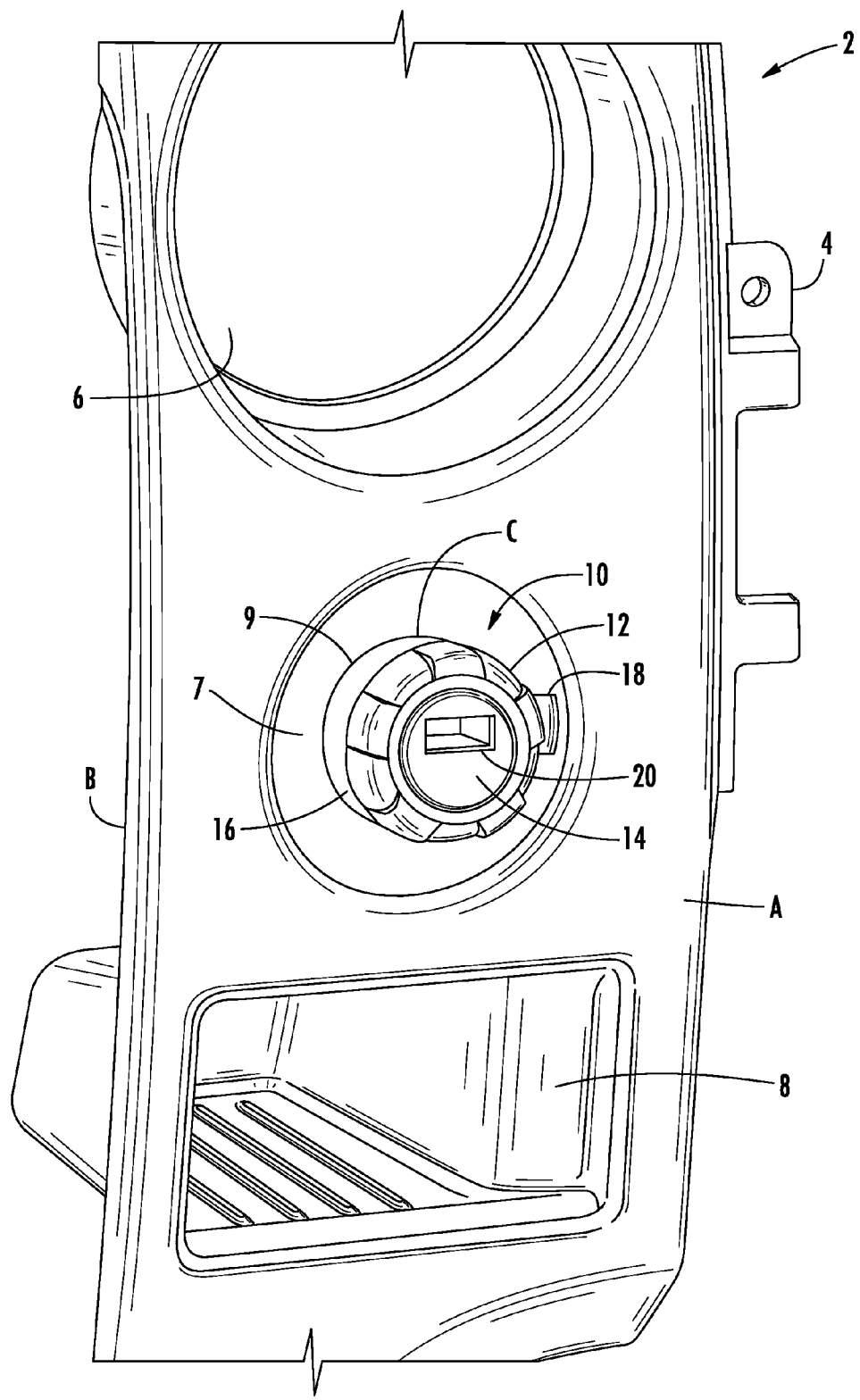
FIG. 1 is a fragmentary perspective view of a vehicle panel having an electrical socket with a cap in a closed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a powered cap assembly of the present invention. The cap assembly 10 is shown disposed on a vehicle panel 2 which a standard vehicle panel is shown for exemplary purposes only. In the embodiment shown in FIG. 1, the panel 2 includes an attachment bracket 4, an open aperture 6 in which an air vent may be disposed, and a storage compartment 8. The vehicle panel 2 includes an A side and a B side, as shown in FIG. 1, and further includes a landing area 7 on the A side having an aperture 9 in which a known vehicle electrical socket is received as further described below. The cap assembly 10 is shown in FIG. 1 closing aperture 9 such that access to the electrical socket is closed off.

As further shown in FIG. 1, the cap assembly 10 includes an upper grip portion 12 disposed adjacent to a base portion 16. Centrally located within the upper grip portion 12 is an outer surface 14 having an electrical port 20 disposed thereon. The electrical port 20, as shown in FIG. 1, may be a Universal Serial Bus (USB) port disposed on the outer surface 14 of the cap assembly 10. In this way, the electrical port 20 is accessible when the cap assembly 10 is in the closed position C, as shown in FIG. 1. The cap assembly 10 is coupled to a receptacle by a powered tether 18 as further described below. The electrical port 20 is powered through a power connection established through the tether 18 as further described below.

Figure 2:
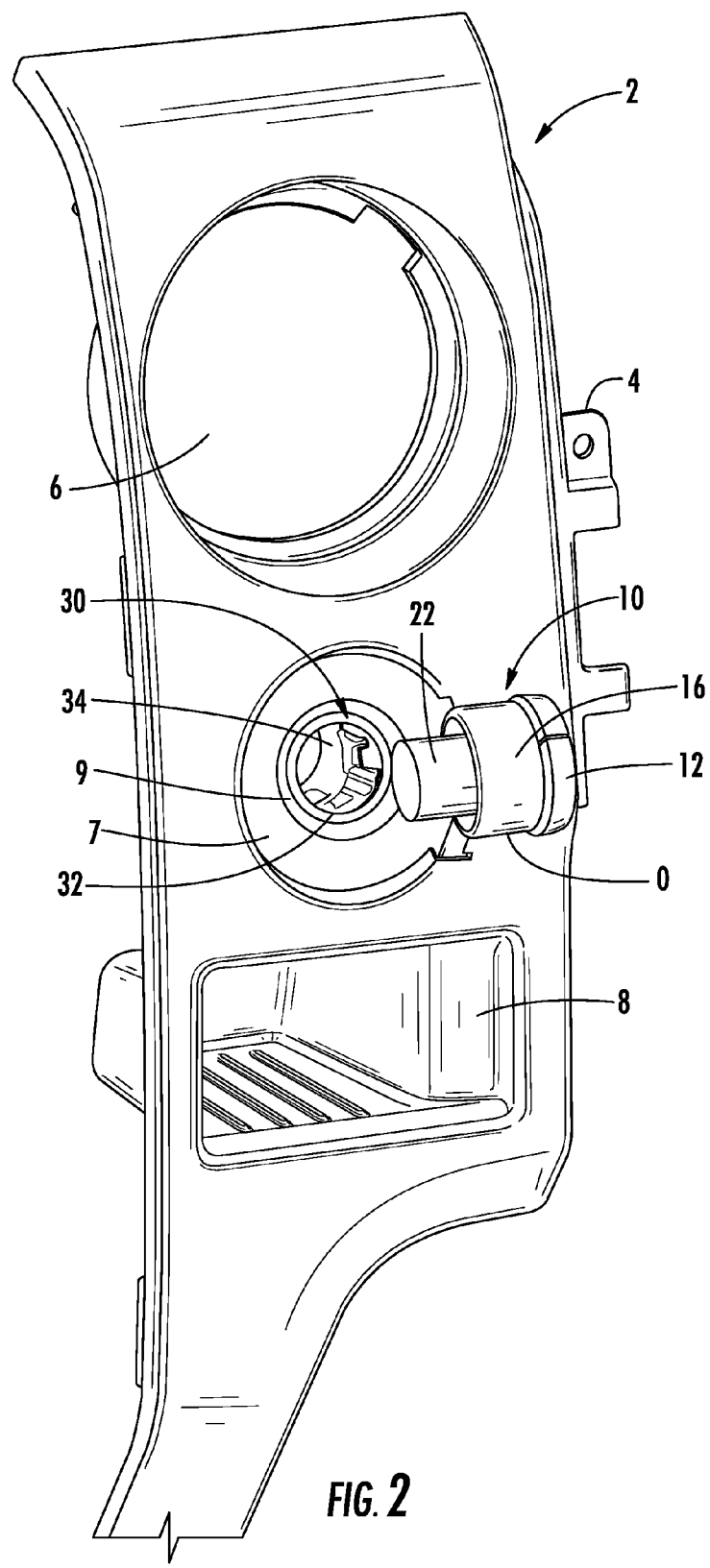
FIG. 2 is a fragmentary perspective view of the vehicle panel of FIG. 1 with the cap in an open position.

Referring now to FIG. 2, the cap assembly 10 is shown in an open position O. With the cap assembly 10 in the open position, a power receptacle 30 is accessible, wherein the receptacle 30 includes an opening 32 and a socket well 34. The socket well 34 is generally comprised of a metallic substrate, or a combination metallic and plastic substrate, wherein the socket well 34 is adapted to receive an electrical plug or other like connector known to those of skill in the art. The socket well 34 is generally connected to an electrical connector from a power source, such as a car battery, for electrically energizing the receptacle 30. Thus, with the cap assembly 10 in the open position O, the receptacle 30 is adapted to receive an electrical plug or connector of an electronic device through the opening 32 of the receptacle 30. Once in place, an electric plug or connector is energized by an electrical connection with power pads disposed on the socket well 34. As further shown in FIG. 2, the cap assembly 10 includes a socket guide 22 which is used to guide the cap assembly 10 into the opening 32 of the receptacle 30 and is further adapted to retain the cap assembly 10 in the closed position C as shown in FIG. 1.

Figure 3A:
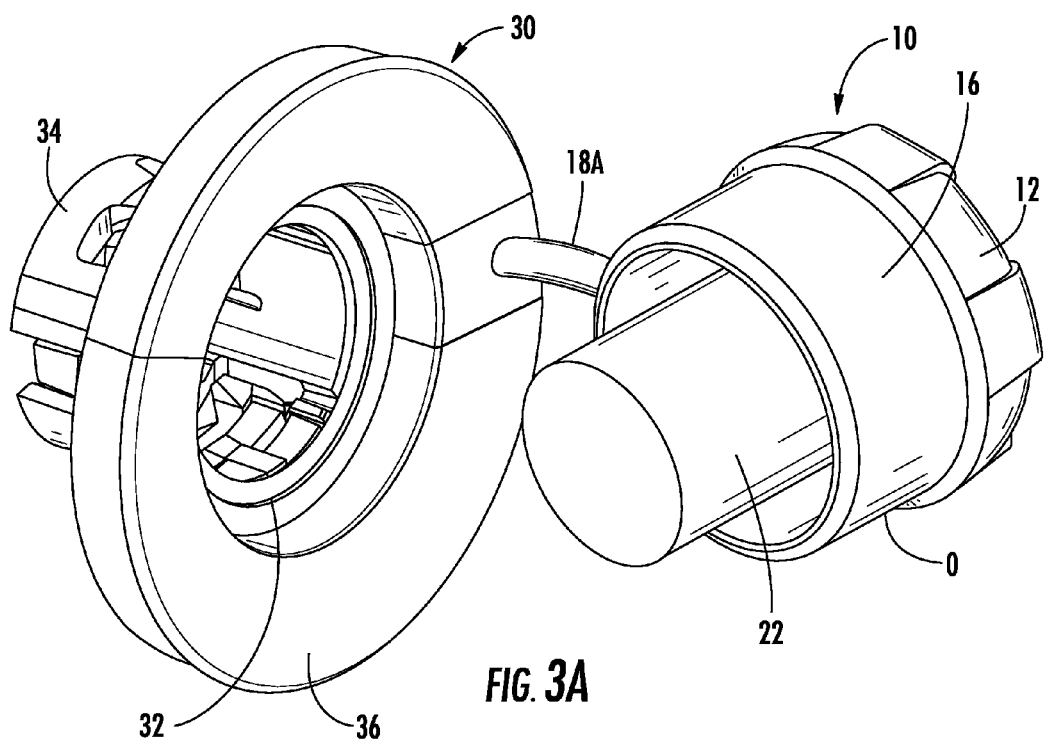
FIG. 3A is a perspective view of an electrical socket with a cap in an open position.

Referring now to FIG. 3A, the cap assembly 10 is shown in the open position O relative to the receptacle 30 and opening 32. As further shown in FIG. 3A, the receptacle 30 includes an outer bezel 36 to which tether 18A is coupled. As noted above, the socket well 34 are coupled to a power source for energizing the receptacle 30, such as a car battery. In the present invention, the tether 18A is also connected to the same power source either directly or through the socket well 34. When powered through the socket well 34, the cap assembly 10 provides for a powered cap assembly that does not require additional wiring for use with a known receptacle. In the embodiment shown in FIG. 3A, the tether 18A is a flexible wire tether which allows the cap assembly 10 to be moved between the closed position C and open position O freely while insuring that the cap assembly 10 is both powered and mechanically coupled to the receptacle 30. Thus, the tether 18A, as shown in FIG. 3A, is electrically coupled to the socket well 34 which is electrically coupled to a power source of a vehicle and further serves as a mechanical coupling between the receptacle 30 at the bezel 36 and the cap assembly 10 at the base portion 16. Thus, the cap assembly 10 is always powered and mechanically coupled to the receptacle for charging or powering of an electronic device.

Figure 3B:
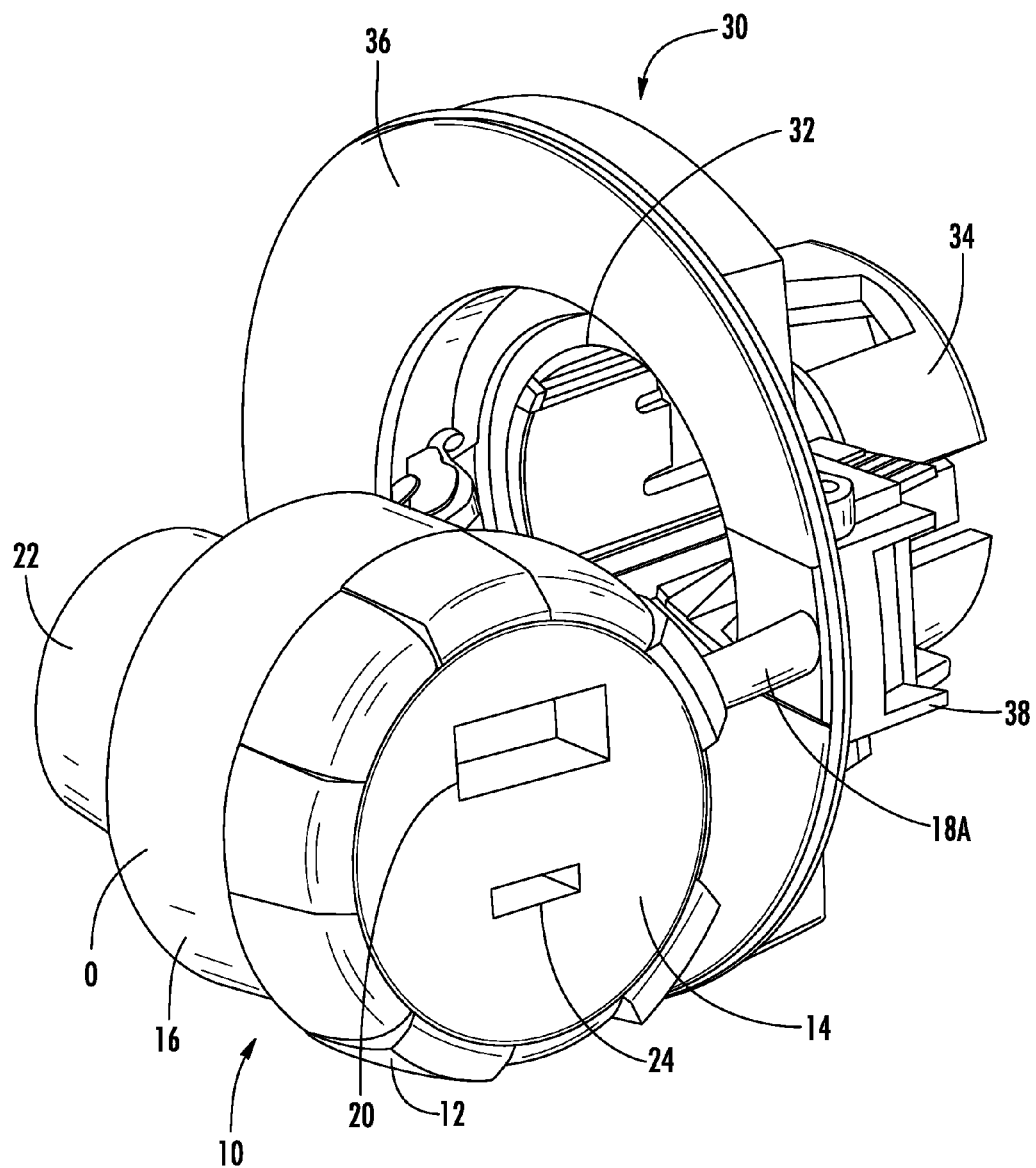
FIG. 3B is a perspective view of the electrical socket of FIG. 3A.

Referring now to FIG. 3B, the powered cap assembly 10 is shown in the open position O such that access to the receptacle 30 through the opening 32 is available. In this open position O, the cap assembly 10 allows access to the receptacle opening 32 for standard 12V charging at the power point defined by the receptacle 30. The tether 18A is shown in FIG. 3B coupled to a power coupling 38 which is further coupled to the socket well 34. Thus, additional wiring within the vehicle cluster is not required to power the cap assembly 10. The outer surface 14 of the cap assembly 10 includes electrical ports 20 and 24. In the embodiment shown in FIG. 3B, electrical port 20 is contemplated to be a standard USB port, while electrical port 24 is contemplated to be a micro-USB port. In use, both ports 20, 24 are power and charging ports for powering and charging electronic and portable electronic devices known in the art through connecting cables also known in the art. Thus, as shown in FIG. 3B, the outer surface 14 of the cap assembly 10 includes at least one electrical port, and in this embodiment, includes two electrical ports 20, 24 of varying charging and connecting capabilities. While the electrical ports 20, 24 are differing ports by nature, it is contemplated that electrical ports of a like kind may be disposed on the outer surface 14 of the powered cap assembly 10. As explained above, the ports 20, 24, shown in FIG. 3B, are powered by the powered tether 18A which is electronically coupled to the power source of the receptacle 30, through the receptacle 30. Further, it is contemplated that the tether 18A may have enough play or slack therein to allow access to the ports 20, 24 disposed on the outer surface 14 of the powered cap assembly 10, while still providing access to the receptacle 30 while the powered cap assembly 10 is in the open position O. Thus, in the configuration shown in FIG. 3B, the socket well 34 and opening 32 of the receptacle 30 are accessible and adapted for receiving an electrical plug, while the electrical ports 20, 24 are also accessible for powering or charging other electronic devices. In this way, the combination of the receptacle 30 and the powered cap assembly 10, shown in FIG. 3B, provides for a three-way connection assembly for powering up to three separate devices. While the outer surface 14 includes two electrical ports 20, 24, in the embodiment shown in FIG. 3B, it is contemplated that any number of electrical ports may be disposed on the outer surface 14 of the powered cap assembly 10 to define a plurality of ports, so long as sufficient power is provided thereto.

Figure 4:
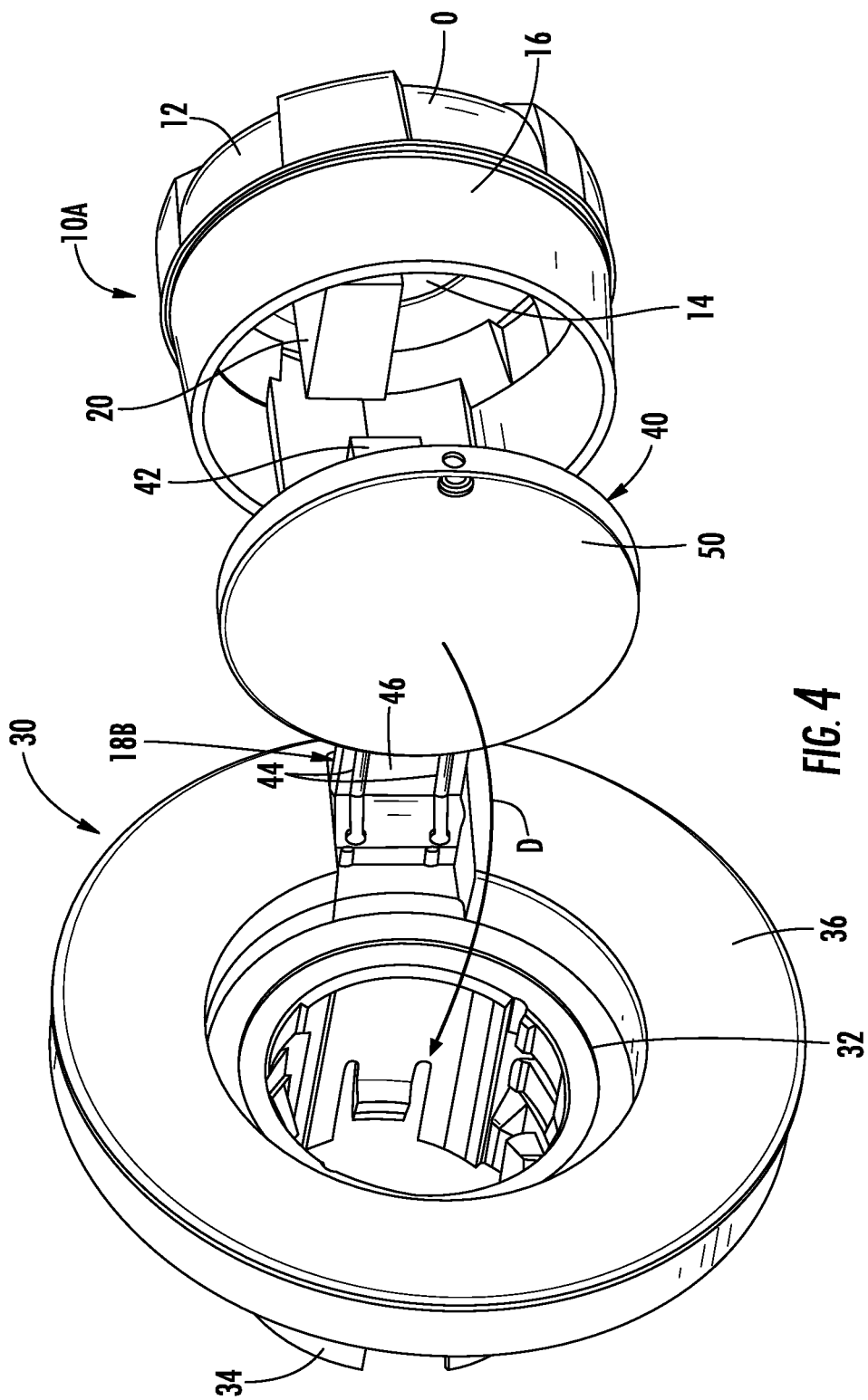
FIG. 4 is a perspective view of an electrical socket of another embodiment of the present invention showing a cap in an open position.

Referring now to FIG. 4, another embodiment of the powered cap assembly 10A is shown having an upper grip portion 12 and a base portion 16 with a centrally located outer surface 14 having an electrical port 20 accessible therefrom. In this embodiment, a rear-side cover 40 includes a power connector 42 that is adapted to couple with and power electrical port 20. The rear-side cover 40 is mechanically and electronically coupled to another embodiment of a tether assembly 18B, as shown in FIG. 4. In the embodiment shown in FIG. 4, the tether assembly 18B is a fixed hinge tether assembly which includes reinforcement members 44 and electronic raceway 46 which provides both power and ground to the powered cap assembly 10A. Thus, the rear-side cover 40 electronically couples to the electrical port 20 via power connector 42 which is powered through the tether 18B through electronic raceway 46. It is contemplated that the reinforcement members 44 are metallic members or other like robust reinforcement member, for providing consistent and accurate movement of the fixed hinge tether assembly 18B. In assembly, the base portion 16 of the powered cap assembly 10A is adapted to couple to the rear-side cover 40, such that the rear-side cover 40 defines an inner surface 50 for the powered cap assembly 10A. In this way, the powered cap assembly 10A includes both inner and outer surfaces 50, 14, wherein the outer surface 14 and inner surface 50 are opposing surfaces disposed on opposite sides of the powered cap assembly 10A. In use, the tether assembly 18B, shown in FIG. 4, is adapted to move the powered cap assembly 10A between open and closed positions O,C, along a path as indicated by arrow D.

Figure 5A:
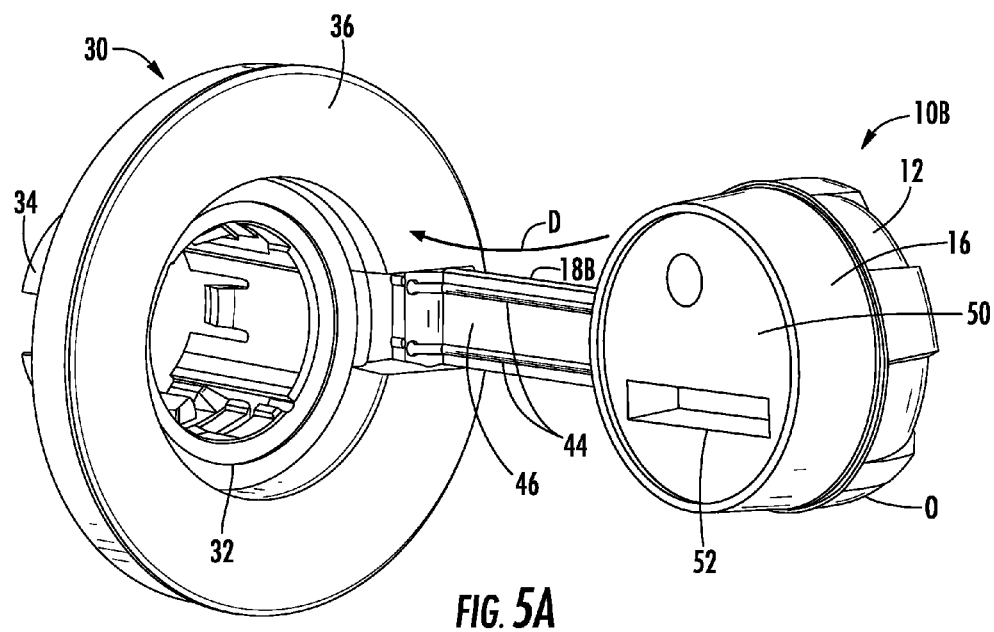
FIG. 5A is a perspective view of an electrical socket of another embodiment of the present invention showing the cap in an open position.
Figure 5B:
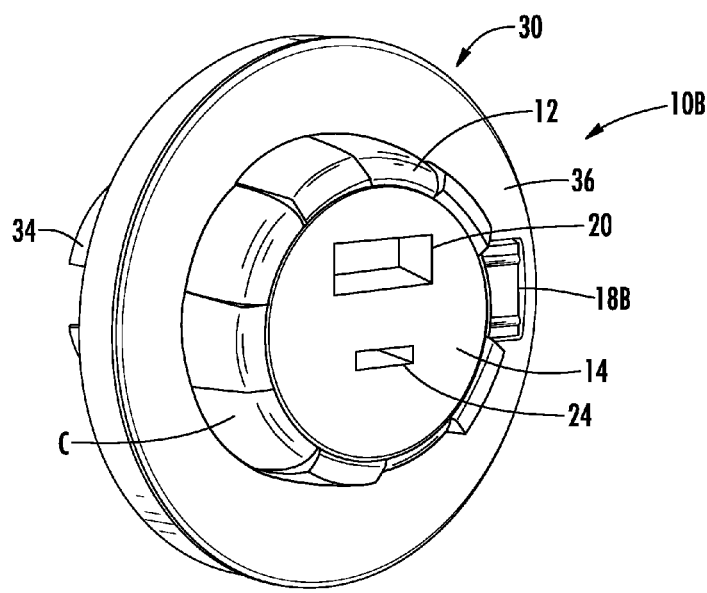
FIG. 5B is a perspective view of the electrical socket shown in FIG. 5A with the cap in a closed position.

Referring now to FIGS. 5A and 5B, another embodiment of the powered cap assembly 10B is shown, having an electrical port 52 disposed on the inner surface 50. With the powered cap assembly 10B shown in the open position O, electrical port 52 defines a first electrical port that is accessible for powering or charging an electronic device. As shown in FIG. 5B, with the powered cap assembly 10B in the closed position C, electrical port 52 is concealed and not accessible, while electrical ports 20, 24 define second and third electrical ports that are readily accessible from outer surface 14. Thus, the inner surface 50 of the powered cap assembly 10B may include one or more electrical ports, such as electrical port 52, which, in this embodiment, is in the form of a standard USB port. Much like ports 20, 24, shown in FIG. 5B, electrical port 52 may be a standard USB port or a micro-USB port adapted for powering or charging an electronic device.

Figure 5C:
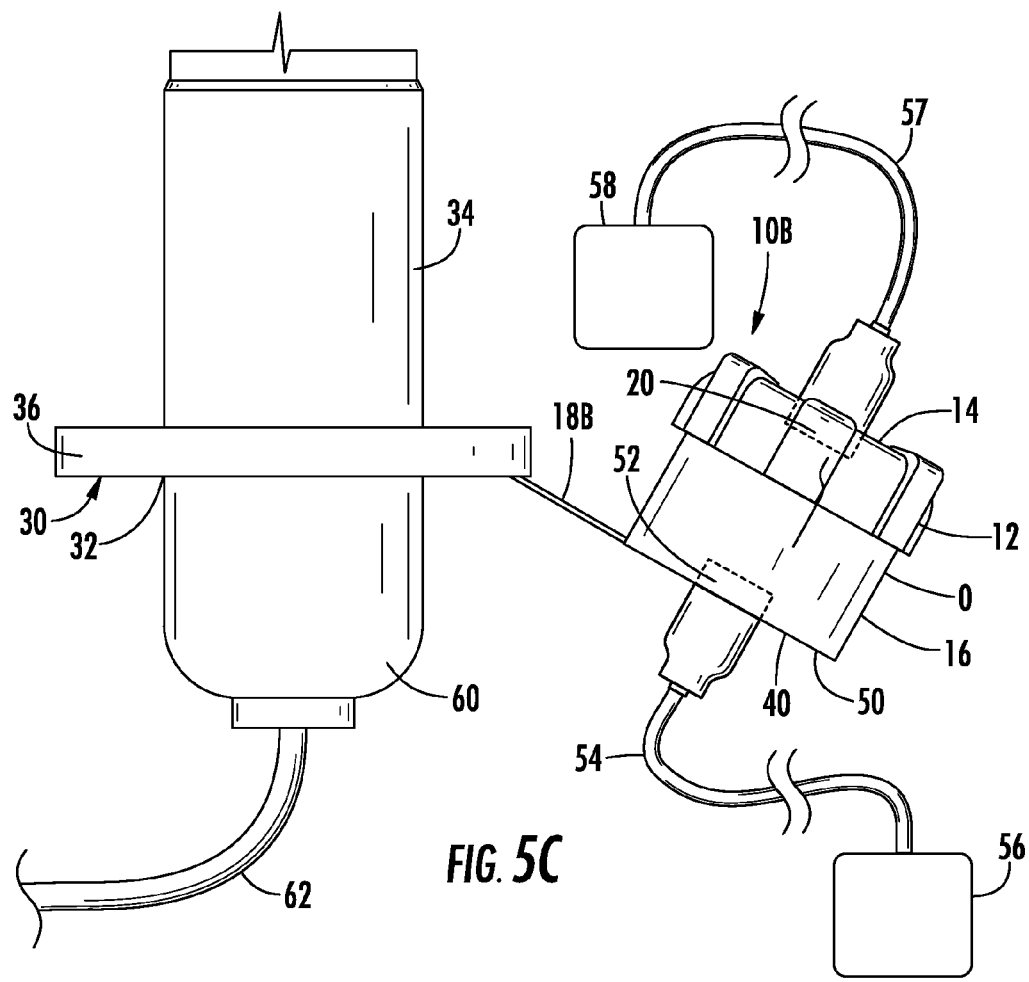
FIG. 5C is a fragmentary top plan view of the electrical socket of FIG. 5A having an electrical plug received therein, with a plurality of electrical cords coupled to the cap with the cap in the open position.

Referring now to FIG. 5C, the powered cap assembly 10B is shown in the open position O, such that electrical port 20, disposed on outer surface 14 of the powered cap assembly 10B, is accessible for coupling to an electronic device 58 via power cable 57. Further, in the open position O, electrical port 52, disposed on inner surface 50, is accessible for coupling to another electronic device 56 via power cable 54. As noted above, the ports 20, 52 are powered through tether assembly 18B which may be in the form of a fixed hinge tether assembly, as shown in FIG. 5C, or a flexible tether wire 18A, shown in FIG. 3A. As further shown in FIG. 5C, an electrical plug 60 is received in receptacle 30 for connection with socket well 34 to power an electronic device via power cable 62. Thus, in the configuration shown in FIG. 5C, electronic devices 58 and 56 are powered by the powered cap assembly 10B, while a third electronic device is powered via power cable 62 having plug 60 received in receptacle 30. As noted above, the outer surface 14 of the powered cap assembly 10B may include one or more electrical ports, such that more electronic devices can be powered by the powered cap assembly 10B so long as sufficient power is provided thereto.

Further, electrical ports 20, 24, and 52 may include high-speed and medium-speed vehicle controller area network (CAN)-buses for establishing 2-way communication with a portable electronic device and an accessory protocol interface module, such as, for example, an audio control module disposed within the vehicle. In this way, the powered cap assembly 10 of the present invention can be used to communicate with a vehicle subsystem while the powered cap assembly 10 is in the closed position C through electrical ports 20 and 24, and through electrical ports 20, 24, and 52 when the powered cap assembly 10 is in the open position O. The powered cap assembly 10 and receptacle 30 may be positioned on a vehicle dash, console or in a passenger second or third row seating area, or anywhere within a vehicle interior where a power port, charging port or interface communication port is desired. Such a location may include a deck lid, trunk area or tail gate where a receptacle may be located for controlling a sound system of a vehicle. In this way, the user does not have to be in the cab of the vehicle to control the sound system. Current vehicle electrical systems may include a multi-chip module (MCM) having multiple integrated circuits that have USB ports, a smart card port, or an MP3 jack that vehicle occupants use to synchronize or pair their portable electronic devices with the vehicle's electrical system. Such coupling may also be acquired using a wireless connection. With the present invention, the powered cap assembly 10 can be electronically coupled with an existing MCM module of a vehicle and placed in the second or third row seating areas as well as car-rearward locations, such as the trunk, deck lid, or tail gate of the vehicle. As electronically coupled or wired to the MCM module, the powered cap assembly 10 can provide a port of communication with the MCM module using electrical ports, such as electrical ports 20, 24, and 52. In this way, the present invention provides a remote synchronization interface with an existing MCM module, or other like vehicle subsystem, disposed within a vehicle.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electrical socket comprising:
   a receptacle having an opening with a removable cap, the cap having an inner surface and an outer surface;
   a tether coupled to the receptacle and the cap;
   a first electrical port disposed on the outer surface of the cap; and
   a second electrical port disposed on the inner surface of the cap, wherein the second electrical port is accessible when the cap is in an open position.

2. The electrical socket of claim 1, wherein the tether is electronically coupled to the receptacle and further wherein the tether provides power to both the first and second electrical ports.

3. The electrical socket of claim 1, wherein only the first electrical port is accessible when the cap is in a closed position, and further wherein both the first and second electrical ports are accessible when the cap is in the open position.

4. The electrical socket of claim 3, wherein the receptacle is accessible when the cap is in the open position.

5. The electrical socket of claim 4, wherein the first and second electrical ports comprise USB ports capable of powering an electronic device.

6. The electrical socket of claim 5, wherein the receptacle comprises a 12-volt power point adapted to receive an electrical plug.

7. An electrical socket comprising:
- a socket well having an opening for receiving an electrical plug;
- a cap having inner and outer surfaces, the cap operable between open and closed positions relative to the opening of the socket well;
- at least one electrical port disposed on the outer surface of the cap, wherein the at least one electrical port is accessible when the cap is in the closed position; and
- a tether coupling the socket well and the cap, the tether providing power to the at least one electrical port.

8. The electrical socket of claim 7, wherein the at least one electrical port includes a plurality of electrical ports.

9. The electrical socket of claim 8, wherein the plurality of electrical ports includes at least one USB port and at least one micro-USB port.

10. The electrical socket of claim 9, including:
- an electrical port disposed on the inner surface of the cap, wherein the electrical port is accessible when the cap is in the open position.

11. The electrical socket of claim 7, including:
- an electrical port disposed on the inner surface of the cap, wherein the electrical port is accessible when the cap is in the open position.

12. The electrical socket of claim 11, wherein the socket well is accessible when the cap is in the open position.

13. The electrical socket of claim 12, wherein the tether comprises a flexible wire tether.

14. The electrical socket of claim 12, wherein the tether comprises a fixed hinge tether.

15. A cap for an opening of an electrical socket comprising:
- inner and outer surfaces;
- a first electrical port disposed on the outer surface;
- a second electrical port disposed on the inner surface; and
- wherein the first electrical port alone is accessible when the cap is in a closed position, and further wherein both the first and second electrical ports are accessible when the cap is in an open position.

16. The cap for an opening of an electrical socket of claim 15, wherein the first and second electrical ports comprise USB ports capable of powering a portable electronic device.

17. The cap for an opening of an electrical socket of claim 16, wherein the first and second USB ports are electronically coupled to a vehicle subsystem and configured to establish communication between a portable electronic device and the vehicle subsystem.

18. The cap for an opening of an electrical socket of claim 17, including:
- a micro-USB port disposed on the outer surface.

19. The cap for an opening of an electrical socket of claim 15, wherein the inner and outer surfaces are opposing surfaces each including a plurality of electrical ports.

* * * * *